(12) United States Patent
Ito et al.

(10) Patent No.: US 11,239,480 B2
(45) Date of Patent: Feb. 1, 2022

(54) FUEL CELL SYSTEM

(71) Applicant: TOYOTA JIDOSHA KABUSHIKI KAISHA, Toyota (JP)

(72) Inventors: Masayuki Ito, Sunto-gun (JP); Tomohiko Kaneko, Okazaki (JP); Hideyuki Kumei, Sunto-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 139 days.

(21) Appl. No.: 16/582,251

(22) Filed: Sep. 25, 2019

(65) Prior Publication Data
US 2020/0112039 A1 Apr. 9, 2020

(30) Foreign Application Priority Data

Oct. 5, 2018 (JP) .............................. JP2018-190431

(51) Int. Cl.
| | |
|---|---|
| *H01M 8/04828* | (2016.01) |
| *H01M 8/04082* | (2016.01) |
| *H01M 8/04746* | (2016.01) |
| *B60L 50/71* | (2019.01) |
| *B60L 50/72* | (2019.01) |
| *B60L 58/30* | (2019.01) |
| *H01M 8/04537* | (2016.01) |

(52) U.S. Cl.
CPC .......... *H01M 8/0494* (2013.01); *B60L 50/71* (2019.02); *B60L 50/72* (2019.02); *B60L 58/30* (2019.02); *H01M 8/04201* (2013.01); *H01M 8/04552* (2013.01); *H01M 8/04753* (2013.01); *H01M 2250/20* (2013.01)

(58) Field of Classification Search
CPC ...... B60L 2240/80; B60L 50/71; B60L 50/72; B60L 50/75; B60L 58/30; H01M 2250/20; H01M 8/04089; H01M 8/04201; H01M 8/043; H01M 8/04552; H01M 8/04604; H01M 8/04753; H01M 8/0488; H01M 8/0494; H01M 8/249
See application file for complete search history.

(56) References Cited

U.S. PATENT DOCUMENTS

| | | | |
|---|---|---|---|
| 2012/0088171 A1* | 4/2012 | Edmiston ............ | H01M 8/0494 429/429 |
| 2016/0141905 A1* | 5/2016 | Yamanaka .............. | B60L 50/52 320/135 |

FOREIGN PATENT DOCUMENTS

| | | |
|---|---|---|
| JP | 62-150664 | 7/1987 |
| JP | 2006-179242 | 7/2006 |
| JP | 2010-055927 | 3/2010 |
| JP | 2016-096086 | 5/2016 |

* cited by examiner

*Primary Examiner* — Adam A Arciero
(74) *Attorney, Agent, or Firm* — Finnegan, Henderson, Farabow, Garrett & Dunner, LLP

(57) ABSTRACT

A fuel cell system includes: a fuel cell unit; first and second supply systems; a switching device; a switching control unit, when required power of the fuel cell unit is equal to or smaller than a threshold; an open circuit voltage obtaining unit; and a supply system control unit.

6 Claims, 7 Drawing Sheets

FUEL CELL SYSTEM

CROSS-REFERENCE TO RELATED APPLICATION

This application is based upon and claims the benefit of priority of the prior Japanese Patent Application No. 2018-190431, filed on Oct. 5, 2018, the entire contents of which are incorporated herein by reference.

TECHNICAL FIELD

The present disclosure relates to a fuel cell system.

BACKGROUND

When required power of a fuel cell is equal to or smaller than a threshold, the fuel cell is electrically disconnected to load devices. When an open circuit voltage of the fuel cell in this state is too high, a cathode catalyst of the fuel cell might be eluted. Therefore, the open circuit voltage is suppressed from being too high, by supplying a sufficient amount of hydrogen to the inside of the fuel cell and by controlling a flow rate of cathode gas to be smaller than a usual flow rate so as to reduce the amount of oxygen remaining inside the fuel cell. However, when the required power increases in a state where the amount of oxygen remaining inside the fuel cell is too small, a response of the actual power deteriorates. For this reason, the flow rate of the cathode gas is increased and decreased such that the open circuit voltage converges within a target range (See, for example, Japanese Unexamined Patent Application Publication No. 2016-096086).

In a fuel cell system including such fuel cells, it is conceivable that any open circuit voltages of the fuel cells are low when the required power increases. In this case, the response of the actual power to the required power might deteriorate.

SUMMARY

It is therefore an object of the present disclosure to provide a fuel cell system in which a response to required power is improved.

The above object is achieved by a fuel cell system including: a fuel cell unit including first and second fuel cells that supplies electric power to a load device; first and second supply systems that respectively control first and second flow rates of cathode gas respectively supplied to the first and second fuel cells; a switching device capable of switching the fuel cell unit and the load device between an electrically connected state where the fuel cell unit is electrically connected to the load device, and an electrically disconnected state where the fuel cell unit is electrically disconnected to the load device; a switching control unit configured to switch the fuel cell unit and the load device to the electrically disconnected state, when required power of the fuel cell unit is equal to or smaller than a threshold; an open circuit voltage obtaining unit configured to obtain a first open circuit voltage of the first fuel cell and a second open circuit voltage of the second fuel cell in the electrically disconnected state; and a supply system control unit configured to increase and decrease the first and second open circuit voltages so as to respectively converge within first and second target ranges, by controlling the first and second supply systems to increase and decrease the first and second flow rates at different timing.

By increasing and decreasing the first and second flow rates at different timing, the first and second open circuit voltages increase and decrease at different timing, so that one of the first and second open circuit voltages is made to higher than the other of the first and second open circuit voltages. This causes both first and second open circuit voltages to avoid being in low states, thereby improving a response to required power.

The supply system control unit may be configured to increase and decrease the first and second flow rates at different timing, by increasing the second flow rate during at least one of periods in which the second open circuit voltage is decreasing before the second open circuit voltage is equal to or lower than a lower limit value of the second target range.

The supply system control unit may be configured to increase and decrease the first and second flow rates at different timing, by increasing the second flow rate during at least one of periods in which the second open circuit voltage is decreasing when the second open circuit voltage reaches a value obtained by adding the lower limit value of the second target range to a value between 30 percent and 70 percent of a difference between the lower limit value and an upper limit value of the second target range.

The supply system control unit may be configured to increase and decrease the first and second flow rates at different timing, by increasing the second flow rate when the first open circuit voltage is equal to or lower than a first criterion value between an upper limit value and a lower limit value of the first target range and when the second open circuit voltage is equal to or lower than a second criterion value between an upper limit value and a lower limit value of the second target range.

The first criterion value may be obtained by adding the lower limit value of the first target range to a value between 30 percent and 70 percent of a difference between the upper limit value and the lower limit value of the first target range, and the second criterion value may be obtained by adding the lower limit value of the second target range to a value between 30 percent and 70 percent of a difference between the upper limit value and the lower limit value of the second target range.

The supply system control unit may be configured to increase and decrease the first and second flow rates in a same period.

BRIEF DESCRIPTION OF THE DRAWINGS

FIG. 4 is a flowchart illustrating an example of the open-circuit voltage control of an FC 20a;

DETAILED DESCRIPTION

[Configuration of Fuel Cell System]

Figure 1:
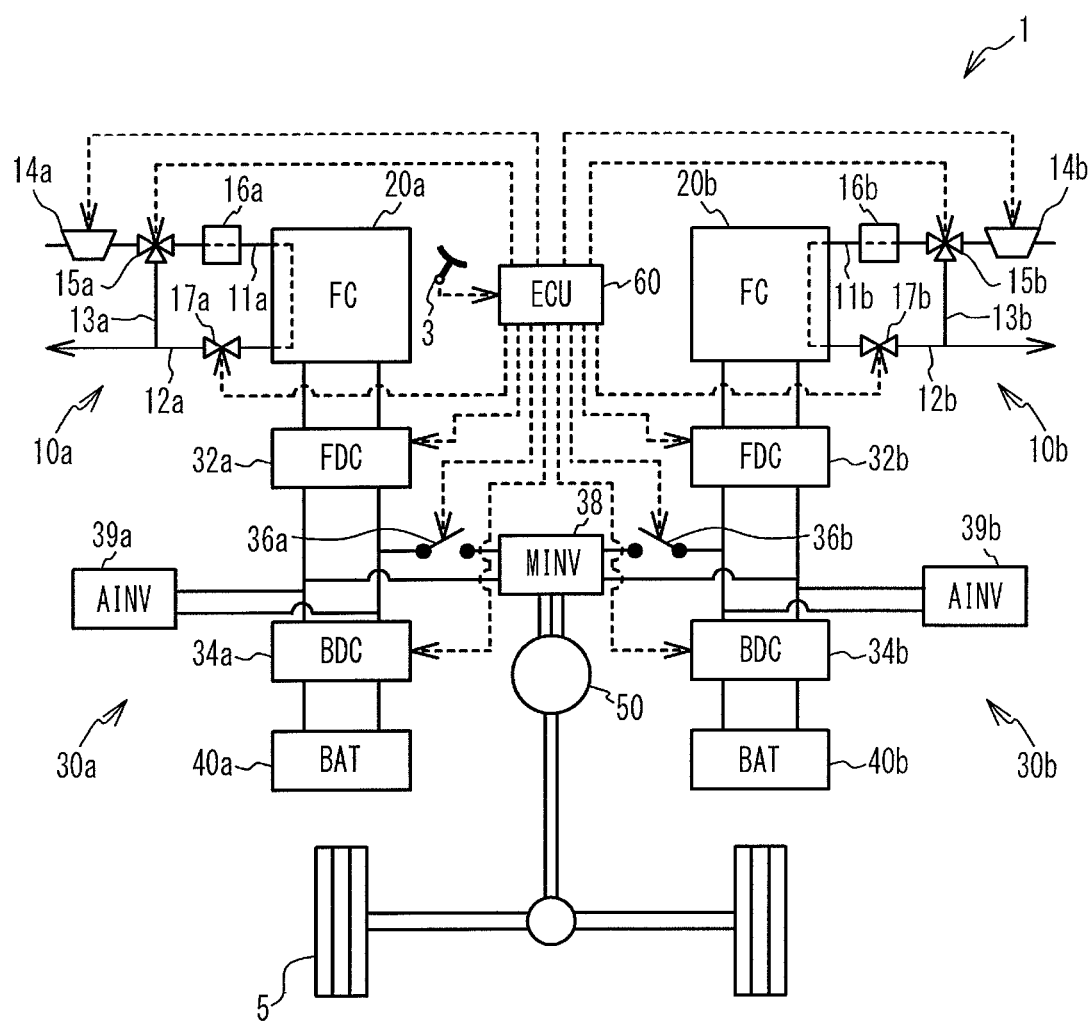
FIG. 1 is a configurational view of a fuel cell system installed in a vehicle.

FIG. 1 is a configurational view of a fuel cell system (hereinafter simply referred to as a system) 1 installed in a vehicle. The system 1 includes cathode gas supply systems 10a and 10b, fuel cells (hereinafter referred to as FCs) 20a and 20b, power control systems 30a and 30b, batteries (hereinafter referred to as BATs) 40a and 40b, a motor 50, and an ECU 60. Further, the system 1 includes an anode gas supply system (not illustrated) that supplies hydrogen gas as anode gas to the FCs 20a and 20b, and a cooling system (not illustrated) that circulates cooling water through the FCs 20a and 20b and cools the FCs 20a and 20b.

The FCs 20a and 20b are fuel cells that receive cathode gas and the fuel gas to generate electric power. Each of the FCs 20a and 20b is formed by stacking unit cells of solid polymer electrolyte types. The FCs 20a and 20b are, not particularly limited, the same fuel cells, and the rated power is also the same. The FCs 20a and 20b are examples of a fuel cell unit, and are also examples of first and second fuel cells, respectively.

The cathode gas supply systems 10a and 10b respectively supply air containing oxygen as cathode gas to the FCs 20a and 20b. Specifically, the cathode gas supply systems 10a and 10b respectively include supply pipes 11a and 11b, discharge pipes 12a and 12b, bypass pipes 13a and 13b, air compressors 14a and 14b, bypass valves 15a and 15b, intercoolers 16a and 16b, and back pressure valves 17a and 17b.

The supply pipes 11a and 11b are respectively connected to cathode inlet manifolds of the FCs 20a and 20b. The discharge pipes 12a and 12b are respectively connected to cathode outlet manifolds of FCs 20a and 20b. The bypass pipe 13a communicates with the supply pipe 11a and the discharge pipe 12a. Likewise, the bypass pipe 13b communicates with the supply pipe 11b and the discharge pipe 12b. The bypass valve 15a is provided at a joint portion of the supply pipe 11a and the bypass pipe 13a. Likewise, the bypass valve 15b is provided at a joint portion of the supply pipe 11b and the bypass pipe 13b. The bypass valve 15a switches a communication state between the supply pipe 11a and the bypass pipe 13a. Likewise, the bypass valve 15b switches the communication state between the supply pipe 11b and the bypass pipe 13b. The air compressor 14a, the bypass valve 15a, and the intercooler 16a are disposed on the supply pipe 11a in this order from the upstream side. The back pressure valve 17a is disposed on the discharge pipe 12a and on the upstream side of a joint portion of the discharge pipe 12a and the bypass pipe 13a. Likewise, the air compressor 14b, the bypass valve 15b, and the intercooler 16b are disposed on the supply pipe 11b in this order from the upstream side. The back pressure valve 17b is disposed on the discharge pipe 12b and on the upstream side of a joint portion of the discharge pipe 12b and the bypass pipe 13b.

The air compressors 14a and 14b respectively supply air containing oxygen as the cathode gas to the FCs 20a and 20b through the supply pipes 11a and 11b. The cathode gas supplied to the FCs 20a and 20b is respectively discharged through the discharge pipes 12a and 12b. The intercoolers 16a and 16b respectively cool the cathode gas supplied to the FCs 20a and 20b. The back pressure valves 17a and 17b respectively control the back pressure on the cathode side of the FCs 20a and 20b.

The power control systems 30a and 30b include fuel cell DC/DC converters (hereinafter referred to as FDCs) 32a and 32b, battery DC/DC converters (hereinafter referred to as BDCs) 34a and 34b, switches 36a and 36b, and auxiliary device inverters (hereinafter referred to as AINV) 39a and 39b. Further, the power control systems 30a and 30b share a motor inverter (hereinafter referred to as MINV) 38 connected to the motor 50. The FDCs 32a and 32b respectively adjust direct-current power from the FCs 20a and 20b, and output the direct-current power to the MINV 38. The BDCs 34a and 34b respectively adjust direct-current power from the BATs 40a and 40b, and output the direct-current power to the MINV 38. The electric power generated by the FCs 20a and 20b is respectively stored in the BATs 40a and 40b. The MINV 38 converts the input direct-current power into three-phase alternating-current power, and supplies the three-phase alternating-current power to the motor 50. The motor 50 drives wheels 5 to drive the vehicle.

The switch 36a opens and closes in response to a command from the ECU 60. When the switch 36a opens, the FC 20a and the BAT 40a are electrically disconnected from the MINV 38, and when the switch 36a closes, the FC 20a and the BAT 40a are connected to the MINV 38. Likewise, the switch 36b opens and closes in response to a command from the ECU 60. When the switch 36b opens, the FC 20b and the BAT 40b are electrically disconnected from the MINV 38, and when the switch 36b closes, the FC 20b and the BAT 40b are electrically connected to the MINV 38. In the disconnected state, the FCs 20a and 20b are electrically disconnected from load devices including the motor 50. The switches 36a and 36b are examples of a switching device capable of switching the FCs 20a and 20b and the load devices between the electrically connected state where the FCs 20a and 20b are electrically connected to the load devices, and the electrically disconnected state where the FCs 20a and 20b are electrically disconnected to the load devices. Herein, the load devices include auxiliary devices for the FCs 20a and 20b and auxiliary devices for the vehicle, in addition to the motor 50. The auxiliary devices for the FCs 20a and 20b include the above-described air compressors 14a and 14b, the bypass valves 15a and 15b, the back pressure valves 17a and 17b, and injectors for supplying the anode gas included in the anode gas supply system to the FCs 20a and 20b, respectively. The auxiliary devices for the vehicle include, for example, an air conditioner, lighting devices, and hazard lamps. Even when the FCs 20a and 20b and the BATs 40a and 40b are disconnected from the MINV 38 by the switches 36a and 36b, the storage power of the BATs 40a and 40b are respectively boosted by the BDCs 34a and 34b, and are capable of being supplied to the air compressors 14a and 14b, the bypass valves 15a and 15b, and the back pressure valves 17a and 17b via the AINVs 39a and 39b. In the present embodiment, the switches 36a and 36b are described as components separated from the FDCs 32a and 32b, but switches respectively provided within the FDCs 32a and 32b may switch between the connected state and the disconnected state.

The ECU 60 includes a central processing unit (CPU), a read only memory (ROM), and a random access memory (RAM). The ECU 60 is electrically connected to an accelerator opening degree sensor 3, the air compressors 14a and 14b, the bypass valves 15a and 15b, the back pressure valves 17a and 17b, the FDCs 32a and 32b, the BDCs 34a and 34b, and the switches 36a and 36b.

The ECU 60 calculates an accelerator opening degree of an opening degree of an accelerator pedal operated by a driver on the basis of the detection value of the accelerator opening degree sensor 3. The ECU 60 calculates an amount of the electrical power needed for driving the motor 50 on the basis of the accelerator opening degree. The ECU 60 calculates the required power of the entire FCs 20a and 20b, on the basis of the power required to drive the auxiliary devices for the FCs 20a and 20b such as the air compressors 14a and 14b, the auxiliary devices for the vehicle such as the motor 50, and the storage power of the BATs 40a and 40b. The ECU 60 controls the FDCs 32a and 32b and the BDCs 34a and 34b so as to supply the amount of the electrical power corresponding to the required power of the entire FCs 20a and 20b from the entire FCs 20a and 20b to the MINV 38. In the present specification, "required power" means, not each required power of the FCs 20a and 20b, but the required power of the entire FCs 20a and 20b, that is, the required power of the fuel cell unit.

Further, the ECU 60 executes open-circuit voltage control as will be described later in detail. The open-circuit voltage control is executed by a switching control unit, an open circuit voltage obtaining unit, and a supply system control unit that are functionally implemented by the CPU, the ROM, and the RAM.

[Open Circuit Voltage]

For example, when the accelerator opening degree decreases, the required power also decreases. When the required power is equal to or smaller than a threshold described later, the switches 36a and 36b electrically disconnect the FCs 20a and 20b from the load devices, and then the vehicle is brought into an idle state. Herein, in the disconnected state where the FCs 20a and 20b are electrically disconnected from the load devices, the FCs 20a and 20b are in a state where power generation is temporarily stopped. In such a state, each current of the FCs 20a and 20b is zero, and each voltage in this state is referred to as an open circuit voltage. When an increase in the accelerator opening degree makes the required power greater than the threshold again in such an idle state, the switches 36a and 36b electrically connect the FCs 20a and 20b to the load devices. Thus, the electric power generated by the FCs 20a and 20b is supplied to the motor 50, and then the vehicle is in a driving state.

Herein, in the disconnected state where the FCs 20a and 20b are electrically disconnected from the load devices, oxygen and hydrogen are not consumed in electric power generation. However, hydrogen cross-leaks from an anode side to a cathode side through an electrolyte membrane, so that hydrogen and oxygen react to form water on the cathode side. This reduces the oxygen concentration on the cathode side.

A decrease in the oxygen concentration on the cathode side decreases the open circuit voltage. The open circuit voltage is desirably kept high even in the disconnected state, in consideration of the response of the actual power of the FCs 20a and 20b when the required power increases after the open circuit voltage is decreased. This is because a high open circuit voltage means high oxygen concentration on the cathode side, and the electric power of the FCs 20a and 20b responsively increases when the required power increases in a state of the high oxygen concentration on the cathode side. However, the open circuit voltage is too high, so that the cathode catalyst might be eluted to reduce the power performance of the FCs 20a and 20b. Therefore, the above-described open-circuit voltage control for holding the open circuit voltage within a predetermined target range is executed. In the open-circuit voltage control, the flow rate of the cathode gas supplied to each of the FCs 20a and 20b increases and decreases such that each open circuit voltage of the FCs 20a and 20b repeatedly increases and decreases to converge within the target range. Additionally, the above target range is not a range in which a problem occurs immediately when the open circuit voltage deviates from the target range. The target ranges of the open circuit voltages of the FCs 20a and 20b are respective examples of the first and second target ranges.

[Timing Chart of Open-Circuit Voltage Control]

Figure 2:
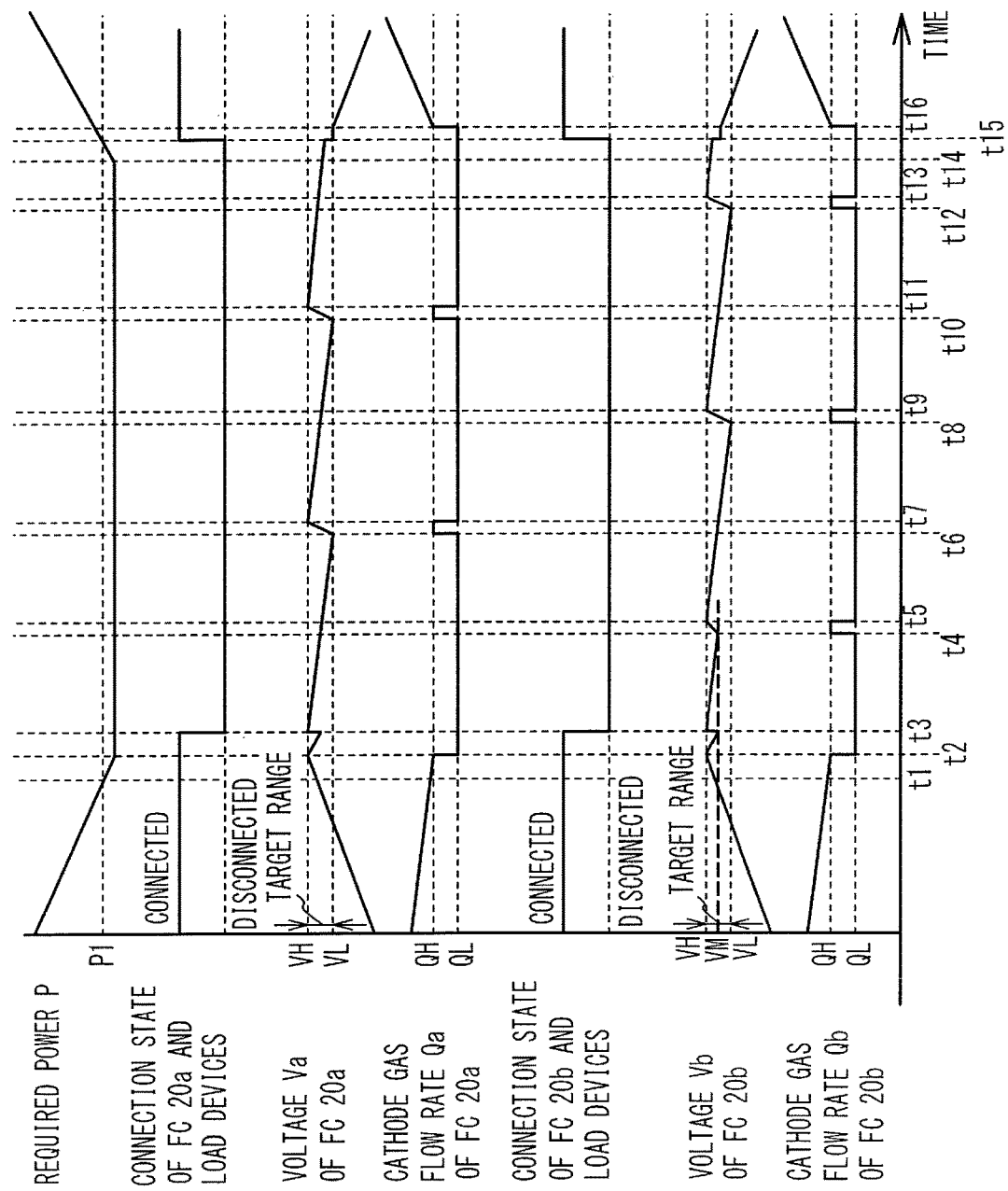
FIG. 2 is a timing chart illustrating an example of open-circuit voltage control.

FIG. 2 is a timing chart illustrating an example of the open-circuit voltage control. FIG. 2 illustrates a transition of the required power P, the connected state between each of the FCs 20a and 20b and the load devices, a transition of the respective flow rates Qa and Qb of the cathode gas supplied to the FCs 20a and 20b, and a transition of the respective voltages Va and Vb of the FCs 20a and 20b. In addition, the flow rates Qa and Qb during the execution of the open-circuit voltage control described below are controlled by adjusting the opening degree of the bypass valves 15a and 15b while keeping the rotational speeds of the air compressors 14a and 14b constant and keeping the opening degree of the back pressure valves 17a and 17b constant.

For example, when the accelerator opening degree gradually decreases while the vehicle is in a driving state, the required power gradually decreases from time t0. When the required power decreases, the flow rates Qa and Qb decrease so as to decrease the power of the FCs 20a and 20b. Further, the power of the FCs 20a and 20b decrease, so the currents of the FCs 20a and 20b decrease and the voltages Va and Vb increase.

For example, when the accelerator opening degree reaches zero, the required power P is equal to or smaller than a threshold P1 at time t1. The threshold P1 is a preset value and is a threshold for determining whether the required power P may be regarded as substantially zero. In other words, the threshold P1 is a threshold for determining whether there may be no power generation request to the FCs 20a and 20b. Additionally, when the required power P is greater than the threshold P1, the flow rates Qa and Qb are controlled to be each greater than a target flow rate QH. Further, the threshold P1 is not limited to substantially zero, for example, and may be a value of small power required to drive the vehicle and to operate the auxiliary devices, which can be sufficiently managed only by the BATs 40a and 40b.

At time t2 when the required power P is substantially constant after a predetermined minute time has elapsed from time t1 when the required power P is equal to or smaller than the threshold P1, the flow rates Qa and Qb are each controlled to be the target flow rate QL. The target flow rate QL is smaller than the target flow rate QH. The flow rates Qa and Qb are each controlled to be from the target flow rate QH to the target flow rate QL, by controlling the opening degrees of the bypass valves 15a and 15b so as to increase the flow rates of cathode gas flowing through the bypass pipes 13a and 13b. When the flow rates Qa and Qb are each controlled to be the target flow rate QL, each IV characteristic of the FCs 20a and 20b deteriorates as compared to an IV characteristic at the time of normal power generation. Therefore, the voltages Va and Vb starts decreasing from time t2.

At time t3 when a predetermined time has elapsed from time t2 at which the voltages Va and Vb start decreasing, the FCs 20a and 20b are disconnected from the load devices and the open-circuit voltage control starts. Thereafter, the voltages Va and Vb immediately increase, and each current of the FCs 20a and 20b, not illustrated, reaches zero. In the state where the FCs 20a and 20b are disconnected from the load devices, the voltages Va and Vb respectively correspond to the open circuit voltages of the FCs 20a and 20b. In addition, although mentioned later in detail, the timing of the disconnection is adjusted such that the voltages Va and Vb, which increase immediately after the FC20a and 20b are disconnected from the load devices, are each equal to or lower than an upper limit value VH. The upper limit value VH is preset.

The voltages Va and Vb decrease due to the above-described cross leak from time t3. That is, the target flow rate QL is set to a low flow rate so as not to increase the open circuit voltage even in consideration of the cross leak. This is because the decrease rate of the oxygen concentration due to the cross leak varies depending on the use environment and the use time of the fuel cell, and it is difficult to estimate the decrease rate beforehand.

When the voltage Vb of the FC 20b reaches a criterion value VM at time t4, the flow rate Qb of the cathode gas to the FC 20b is controlled to increase to the target flow rate QH, so that the voltage Vb starts increasing. The target flow rate QH is set to a flow rate so as to increase the oxygen concentration even in consideration of a decrease amount of the oxygen concentration due to the cross leak. The criterion value VM that will be described later in detail is preset.

When the voltage Vb is equal to or higher than the upper limit value VH at time t5, the flow rate Qb is controlled to decrease again to the target flow rate QL, and then the voltage Vb starts decreasing. When the voltage Va reaches a lower limit value VL at time t6, the flow rate Qa is controlled to increase to the target flow rate QH, and then the voltage Va starts increasing. The lower limit value VL is preset. When the voltage Va reaches the upper limit value VH at time t7, the flow rate Qa is controlled to decrease to the target flow rate QL, and then the voltage Va starts decreasing. Likewise, when the voltage Vb reaches the lower limit value VL at time t8, the flow rate Qb is controlled to increase to the target flow rate QH, and then the voltage Vb starts increasing. When the voltage Vb reaches the upper limit VH at time t9, the flow rate Qb is controlled to decrease to the target flow rate QL, and then the voltage Vb starts decreasing. When the voltage Va reaches the lower limit value VL at time t10, the flow rate Qa is controlled to increase to the target flow rate QH, and the voltage Va starts increasing. When the voltage Va reaches the upper limit value VH at time t11, the flow rate Qa is controlled to decrease to the target flow rate QL, and then the voltage Va starts decreasing. When the voltage Vb reaches the lower limit value VL at time t12, the flow rate Qb is controlled to increase to the target flow rate QH, and then the voltage Vb starts increasing. When the voltage Vb reaches the upper limit value VH at time t13, the flow rate Qb is controlled to decrease to the target flow rate QL, and then the voltage Vb starts decreasing.

As described above, the upper limit value VH and the lower limit value VL are the upper limit value and the lower limit value of the target range of the open circuit voltage, respectively. Therefore, the flow rates Qa and Qb are controlled to increase and decrease such that the voltages Va and Vb repeatedly increase and decrease to converge within the target range. The upper limit value VH is a voltage value suitable for suppressing the elution of the cathode catalyst as described above, and may be within the range, for example, from 0.75 V to 0.9 V, and more specifically, 0.85 V. The lower limit value VL is a voltage value suitable for ensuring a good response to the required power, and may be within the range, for example, from 0.5 V to 0.8 V, more specifically, 0.75 V.

When the required power P starts increasing at time t14, the required power P is greater than the threshold P1 at time t15, and the FCs 20a and 20b are connected to the load devices. After that, the voltages Va and Vb immediately decrease, and each current of the FCs 20a and 20b, not illustrated, immediately increases. By controlling the flow rates Qa and Qb to be each greater than the target flow rate QH at time t16, the voltages Va and Vb decrease, and the power of the FCs 20a and 20b, not illustrated, increases. In the present embodiment, the flow rates Qa and Qb increase at time t16, after the FCs 20a and 20b are connected to the load devices at time t15, but not limited thereto. The FCs 20a and 20b may be connected to the load devices, after the flow rates Qa and Qb increase. The flow rates Qa and Qb may increase and the FCs 20a and 20b may be connected to the load devices simultaneously.

As described above, an increase in the flow rate Qa to the target flow rate QH increases the voltage Vb at time t4 before the voltage Vb reaches the lower limit value VL, and then the flow rates Qa and Qb increase and decrease at different timing. Specifically, times t6 and t10 at which the flow rate Qa starts increasing differ from times t8 and t12 at which the flow rate Qb starts increasing. Likewise, times t7 and t11 at which the flow rate Qa starts decreasing differ from times t5, t8 and t12 at which the flow rate Qb starts decreasing. Therefore, the timing at which the voltage Va starts increasing differs from the timing at which the voltage Vb starts increasing, and the timing at which the voltage Va starts decreasing differs from the timing at which the voltage Vb starts decreasing. This causes both voltages Va and Vb to avoid being low within the respective target ranges.

Herein, assuming that the timing at which the flow rates Qa and Qb start increasing are the same and that the timing at which the flow rates Qa and Qb start decreasing are the same, the timing at which the voltages Va and Vb start increasing are also the same, and the timing at which the voltages Va and Vb start decreasing are the same. Thus, there is a period in which both voltages Va and Vb are low. When the required power P increases and exceeds the threshold P1 in such a period, the response of the actual power of the FCs 20a and 20b to the required power P may deteriorate, which may influence the drivability, because both voltages Va and Vb are low. In the present embodiment, the timing at which the voltages Va and Vb start increasing differ from each other, and the timing at which the voltages Va and Vb start decreasing differ from each other, thereby suppressing the occurrence of the above problem.

As long as the period in which the flow rate Qa increases and decreases is the same as the period in which the flow rate Qb increases and decreases, the rated power of the FCs 20a and 20b may differ from each other, the upper limit values of the open circuit voltages of the FCs 20a and 20b may differ from each other, the lower limit values of the open circuit voltages the FCs 20a and 20b may differ from each other, or the sizes of the target ranges of the open circuit voltages of the FCs 20a and 20b may differ from each other. Further, the flow rates of the cathode gas for increasing the open circuit voltages of the FCs 20a and 20b may differ from each other, or the flow rates of the cathode gas for decreasing the open circuit voltages of the FCs 20a and 20b may differ from each other. This is because the occurrence of the above problem is suppressed by causing the flow rates Qa and Qb to increase and decrease at different timing, in the state where the period in which the flow rate Qa increases and decreases is the same as the period in which the flow rate Qb increases and decreases. Additionally, the period in which the flow rate Qa increases and decreases is not limited to the completely identical to the period in which the flow rate Qb increases and decreases. For example, the period of increase and decrease of one of the flow rates is from 0.9 times to 1.1 times of the period of increase and decrease of the other of the flow rates.

Further, the period in which the flow rate Qa increases and decreases is substantially the same as the period in which the flow rate Qb increases and decreases as described above, thereby making the degrees of aging deterioration of the bypass valves 15a and 15b substantially the same. This is because it is possible to make the number of times of switching the opening degrees of the bypass valves 15a and 15b substantially the same while the open circuit voltage is controlled. Thus, only one of the bypass valves 15a and 15b avoids early aging.

[Flowchart of Open-Circuit Voltage Control]

Figure 3:
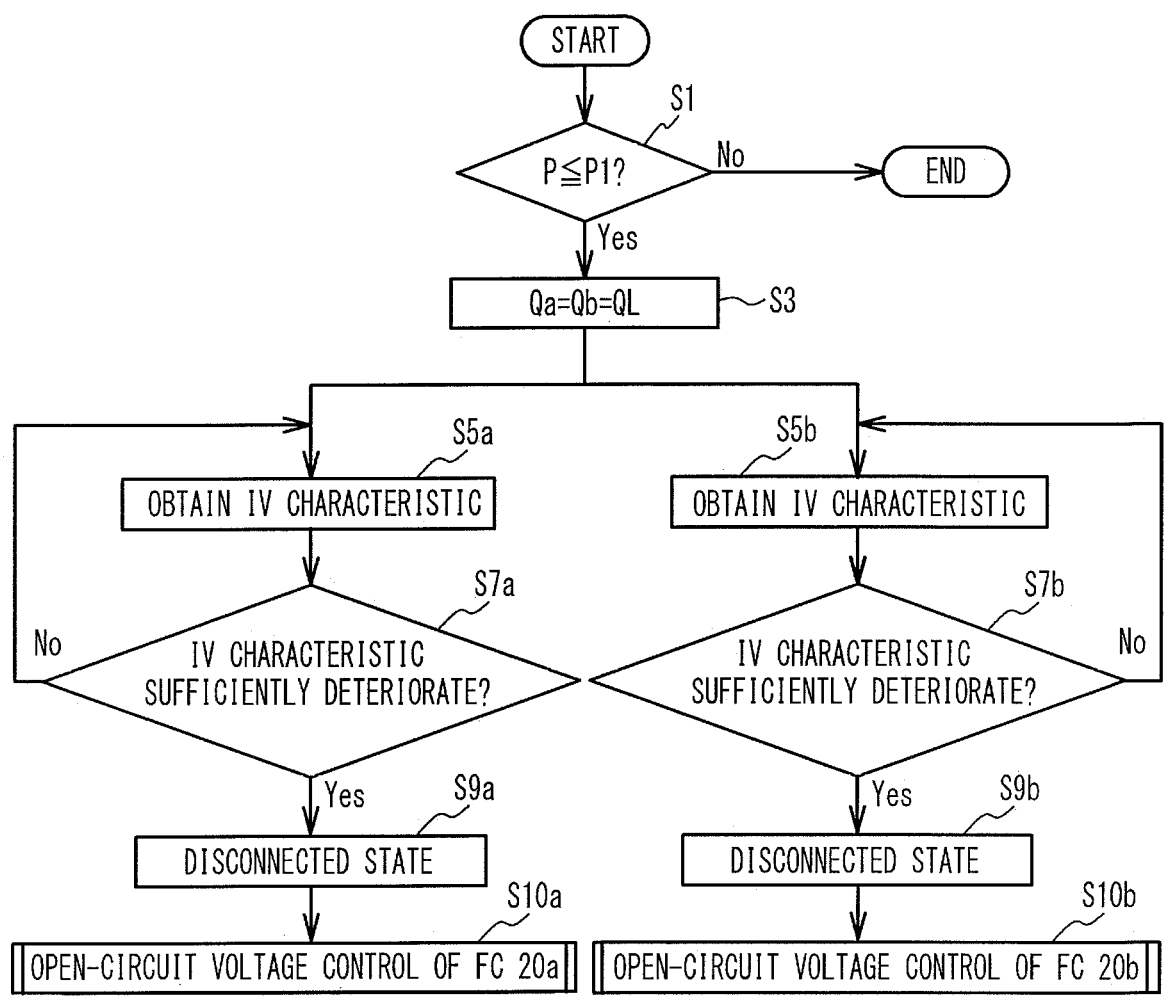
FIG. 3 is a flowchart illustrating an example of the open-circuit voltage control.

FIG. 3 is a flowchart illustrating an example of the open-circuit voltage control. First, the ECU 60 determines whether or not the required power P is equal to or smaller than the threshold P1 (step S1). As described above, the ECU 60 calculates the required power P based on the power required to drive the motor 50 and the auxiliary devices. For example, when the accelerator opening degree is not zero and the vehicle is in a driving state, No is determined in step S1 and the present control is finished.

For example, when the accelerator opening degree is zero, Yes is determined in step S1, and the ECU 60 controls the flow rates Qa and Qb to be the target flow rate QL as at time t2 described above (step S3). Accordingly, the oxygen concentration in the FCs 20a and 20b decreases, and the voltages Va and Vb decrease.

Next, the ECU 60 obtains the IV characteristic of the FC 20a (step S5a), and determines whether or not the IV characteristic of the FC 20a sufficiently deteriorates (step S7a). Likewise, the ECU 60 obtains the IV characteristic of the FC 20b (step S5b), and determines whether or not the IV characteristic of the FC 20b sufficiently deteriorates (step S7b). That is, the target flow rate QL is a flow rate at which the IV characteristic deteriorates due to the low oxygen concentration on the cathode side of the fuel cell in the state where the fuel cell is connected to the load devices. The IV characteristics are obtained on the basis of the respective current values and voltage values of the FCs 20a and 20b after the flow rates Qa and Qb are controlled to be the target flow rate QL. The IV characteristic is considered to deteriorate, as the current value and the voltage value decrease. That is, when the current value and the voltage value are equal to or lower than respective predetermined values, the IV characteristic is determined to sufficiently deteriorate. When No is determined in step S7a, step S5a is executed again. Likewise, when No is determined in step S7b, step S5b is executed again.

When Yes is determined in step S7a, the ECU 60 disconnects the FC 20a from the load devices as at time t3 described above (step S9a). Likewise, when Yes is determined in step S7b, the ECU 60 disconnects the FC 20b from the load devices as at time t3 (step S9b). The processes of steps S9a and S9b are an example of processes executed by the switching control unit configured to switch the FCs 20a and 20b and the load devices to the disconnected state when the required power P is equal to or smaller than the threshold P1. Herein, as illustrated at time t3, the voltages Va and Vb increase to such a degree as not to exceed the upper limit value VH immediately after the disconnection. This is because the above-described disconnection is executed after the IV characteristics are determined to sufficiently deteriorate in the above-described steps S7a and S7b. That is, in steps S7a and S7b, "the IV characteristic sufficiently deteriorates" means that the IV characteristic deteriorates to such an extent that the voltage which increases immediately after the disconnection does not exceed the upper limit value VH.

Next, the ECU 60 executes the open-circuit voltage control of the FC 20a (step S10a), and executes the open-circuit voltage control of the FC 20b (step S10b). In addition, the processes of the above steps S5a and S5b and subsequent processes are executed in parallel.

[Flowchart of Open-Circuit Voltage Control of FC 20a]

Figure 4:
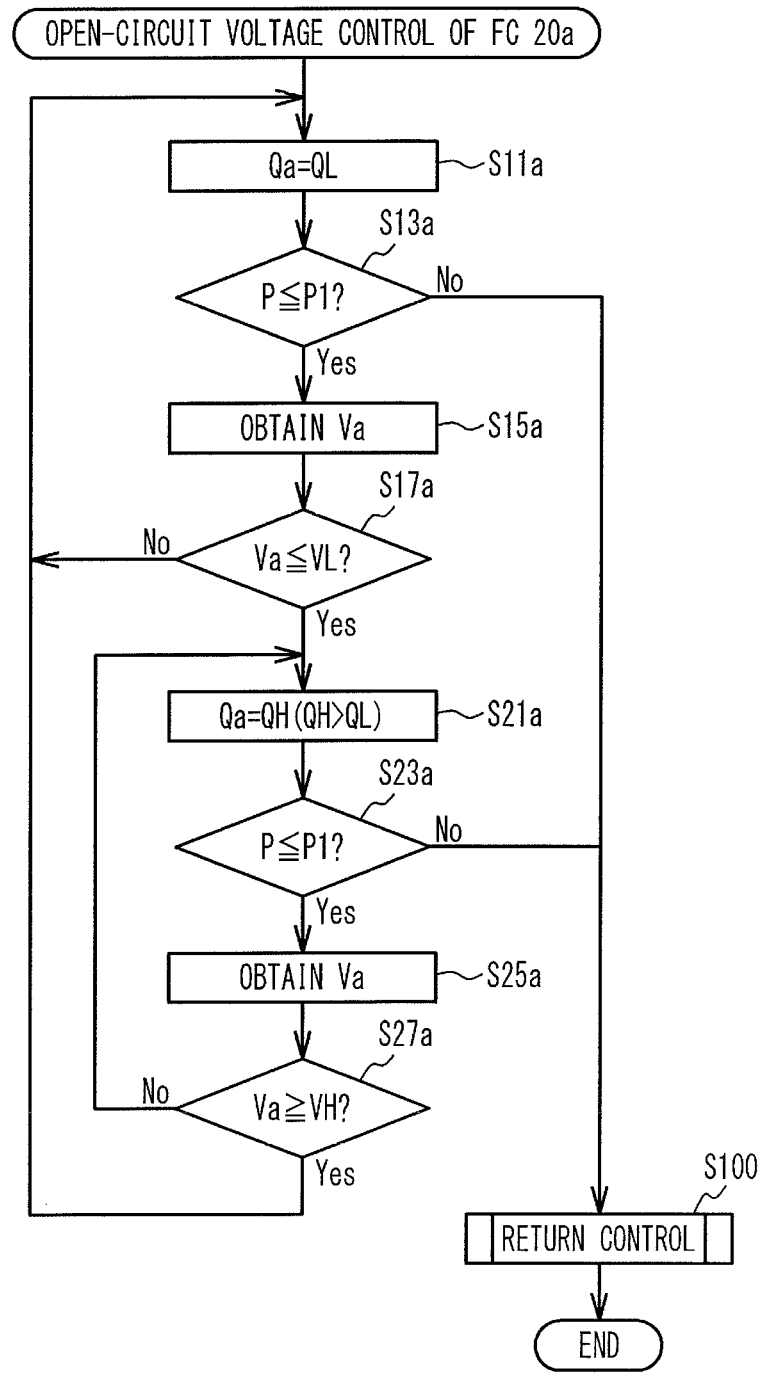

FIG. 4 is a flowchart illustrating an example of the open-circuit voltage control of the FC 20a. First, the ECU 60 controls the flow rate Qa to be the target flow rate QL (step S11a). When the flow rate Qa has already been controlled to be the target flow rate QL in step S3 described above, this state is continued in step S11a. Next, the ECU 60 determines whether or not the required power P is equal to or smaller than the threshold P1 (step S13a). When No is determined in step S13a, the ECU 60 executes return control for returning the FCs 20a and 20b to the normal power generation state (step S100). The return control will be described later.

When Yes is determined in step S13a, the ECU 60 obtains the voltage Va (step S15a), and determines whether or not the voltage Va is equal to or lower than the lower limit value VL (step S17a). When No is determined in step S17a, the ECU 60 executes the process of step S11a and subsequent processes again. That is, as long as Yes is determined in step S13a and No is determined in step S17a, the flow rate Qa is controlled to be the target flow rate QL. For example, the flow rate Qa is controlled to be the target flow rate QL as illustrated after the time t3 described above. Since step S13a is repeatedly executed as long as No is determined in step S17a, the return control is executed, even when the required power increases while the flow rate Qa is controlled to be the target flow rate QL.

When Yes is determined in step S17a, for example, as illustrated at time t6, the ECU 60 controls the flow rate Qa to be the target flow rate QH (step S21a). Next, the ECU 60 determines whether or not the required power P is equal to or smaller than the threshold P1 (step S23a). Likewise, when No is determined in step S23a, the return control is executed (step S100).

When Yes is determined in step S23a, the ECU 60 obtains the voltage Va (step S25a), and determines whether or not the voltage Va is equal to or higher than the upper limit value VH (step S27a). When No is determined in step S27a, the ECU 60 executes the process of step S21a again. As long as Yes is determined in step S23a and No is determined in step S27a, the flow rate Qa is controlled to be the target flow rate QH. That is, as illustrated in the period from time t6 to time t7 described above, the flow rate Qa is controlled to be the target flow rate QH. Since step S23a is repeatedly executed as long as No is determined in step S27a, it is possible to cope with the case where the required power increases while the flow rate Qa is controlled to be the target flow rate QH.

When Yes is determined in step S27a, the ECU 60 executes the process of step S11a and the subsequent processes again, and the flow rate Qa is controlled to be the target flow rate QL, for example, as illustrated at time t7. As described above, by alternately controlling the flow rate Qa to be the target flow rate QH and to be the target flow rate QL, the voltage Va is controlled so as to repeatedly increase and decrease between the upper limit value VH and the lower limit value VL.

The process of step S13a may be executed before step S11a, or may be executed between steps S15a and S17a. Likewise, the process of step S23a may be executed before step S21a, or may be executed between steps 25a and 27a.

[Flowchart of Open-Circuit Voltage Control of FC 20b]

Figure 5:
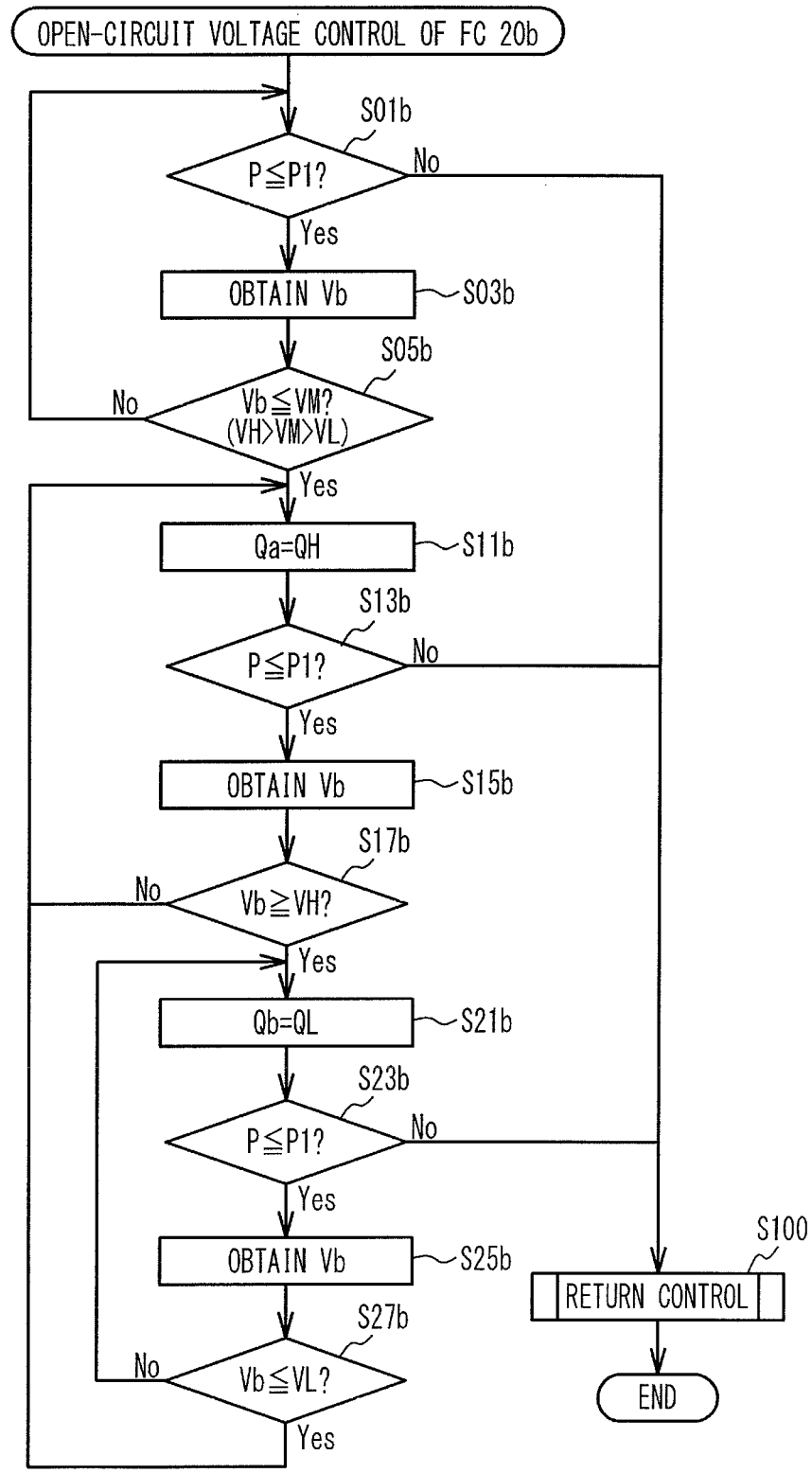
FIG. 5 is a flowchart illustrating an example of the open-circuit voltage control of an FC 20b.

FIG. 5 is a flowchart illustrating an example of the open-circuit voltage control of the FC 20b. As described in above-described step S3, the open-circuit voltage control of the FC 20b is executed in the state where the flow rate Qb is controlled to be the target flow rate QL. First, the ECU 60 determines whether or not the required power P is equal to or smaller than the threshold P1 (step S01b). When No is determined in step S01b, the return control is executed (step S100). When Yes is determined in step S01b, the ECU 60 obtains the voltage Vb (step S03b), and determines whether or not the voltage Vb is equal to or lower than the criterion value VM (step S05b). Herein, the criterion value VM is smaller than the upper limit value VH and greater than the lower limit value VL, and may be, for example, the median between the upper limit value VH and the lower limit value VL. When No is determined in step S05b, the process of step S01b and the subsequent processes are executed again, and the flow rate Qb continues to be controlled to the target flow rate QL. Herein, the criterion value VM is not limited to the median between the upper limit value VH and the lower limit value VL. The criterion value VM may be obtained by adding the lower limit value VL to a value between 30 percent and 70 percent of the difference between the upper limit value VH and the lower limit value VL, or may be obtained by adding the lower limit value VL to a value between 40 percent and 60 percent of the difference between the upper limit value VH and the lower limit value VL. By setting the criterion value VM approximately to the median between the upper limit value VH and the lower limit value VL, an interval between a timing, at which the open circuit voltage of the FC 20a starts decreasing, and next timing, at which the open circuit voltage starts decreasing again, is made substantially the same as an interval of a timing, at which the open circuit voltage of the FC 20b starts decreasing, and next timing, at which the open circuit voltage starts decreasing again. This improves the response.

When Yes is determined in step S05b, the ECU 60 controls and increases the flow rate Qb to the target flow rate QH as at the above-described time t4 (step S11b). Next, the ECU 60 determines whether or not the required power P is equal to or smaller than the threshold P1 (step S13b). When No is determined in step S13b, the ECU 60 executes the return control (step S100). When Yes is determined in step S13b, the ECU 60 obtains the voltage Vb (step S15b), and determines whether or not the voltage Vb is equal to or higher than the upper limit value VH (step S17b). When No is determined in step S17b, the ECU 60 executes the process of step S11b and the subsequent processes again. That is, as long as Yes is determined in step S13b and No is determined in step S17b, the flow rate Qb is maintained at the target flow rate QH.

When Yes is determined in step S17b, the ECU 60 controls and decreases the flow rate Qb to the target flow rate QL as at the above-described time t5 (step S21b). Next, the ECU 60 determines whether or not the required power P is equal to or smaller than the threshold P1 (step S23b). When No is determined in step S23b, the ECU 60 executes the return control (step S100). When Yes is determined in step S23b, the ECU 60 obtains the voltage Vb (step S25b), and determines whether or not the voltage Vb is equal to or lower than the lower limit value VL (step S27b). When No is determined in step S27b, the ECU 60 executes the process of step S21b and the subsequent processes again.

When Yes is determined in step S27b, the ECU 60 executes the process of step S11b and the subsequent processes again to control the flow rate Qb to be the target flow rate QH as at time t8 described above. Like the open-circuit voltage control of the FC 20a, the voltage Vb is controlled to repeatedly increase and decrease between the upper limit value VH and the lower limit value VL by alternately controlling the flow rate Qb to be the target flow rate QH and to be the target flow rate QL.

In the open-circuit voltage control of the FCs 20a and 20b as described above, the voltages Va and Vb increase and decrease at different timing. The processes in steps S11a, S17a, S21a, S27a, S05b, S11b, S17b, S21b, and S27b are an example of processes executed by a supply system control unit configured to periodically increase and decrease the open circuit voltages of the FCs 20a and 20b so as to respectively converge within first and second target ranges, by controlling the bypass valves 15a and 15b to increase and decrease the flow rates Qa and Qb at different timing.

Further, the processes from steps S01b to S05b are repeatedly executed until the voltage Vb is equal to or lower than the criterion value VM after the open-circuit voltage control of the FC 20b starts, and the processes from steps S11b to S27b are repeatedly executed after the voltage Vb is equal to or lower than the criterion value VM. In such a manner, the voltages Va and Vb increase and decrease at different timing, only by adding the processes of steps S01b to S05b to the processes of steps S11b to S27b, which have substantially the same as the open-circuit voltage control of the FC 20a described above. This suppresses an increase in the manufacturing cost of the program that executes such control, and suppresses an increase in the process load on the ECU 60.

In the above-described open-circuit voltage control of the FC 20b, the flow rate Qb is increased during the first period in which the voltage Vb decreases, after the FC 20b is disconnected from the load devices, and before the voltage Vb is equal to or lower than the lower limit value VL, but not limited thereto. For example, the flow rate Qb may be increased during the period in which the voltage Vb decreases for the second time or later, after the FC 20b is brought into the disconnected state, and before the voltage Vb is equal to or lower than the lower limit value VL. However, from the viewpoint of ensuring the response to the increase of the required power, the timing for increasing the voltage Vb is desirably early.

In addition, the process of step S01b may be executed between steps S03b and S05b. The process of step S13b may be executed before step S11b or between steps S13b and 15b. The process of step S23b may be executed before step S21b or between steps S23b and S25b.

[Return Control]

When the required power P is equal to or greater than the threshold P1 in the state where the FCs 20a and 20b are disconnected from the load devices, the ECU 60 controls the switches 36a and 36b to electrically connect the FCs 20a and 20b and the load devices as illustrated at time t15. This causes the voltages Va and Vb to decrease immediately. In the connected states, the flow rates Qa and Qb are controlled to increase in response to an increase in the required power P as illustrated at time t16. Thus, the power of the FCs 20a and 20b also increase to satisfy the required power P. Also, when the return control is executed in the open-circuit voltage control of any of the FCs 20a and 20b, both FCs 20a and 20b return to the normal power generation state.

[Timing Chart of Variation of Open-Circuit Voltage Control]

Figure 6:
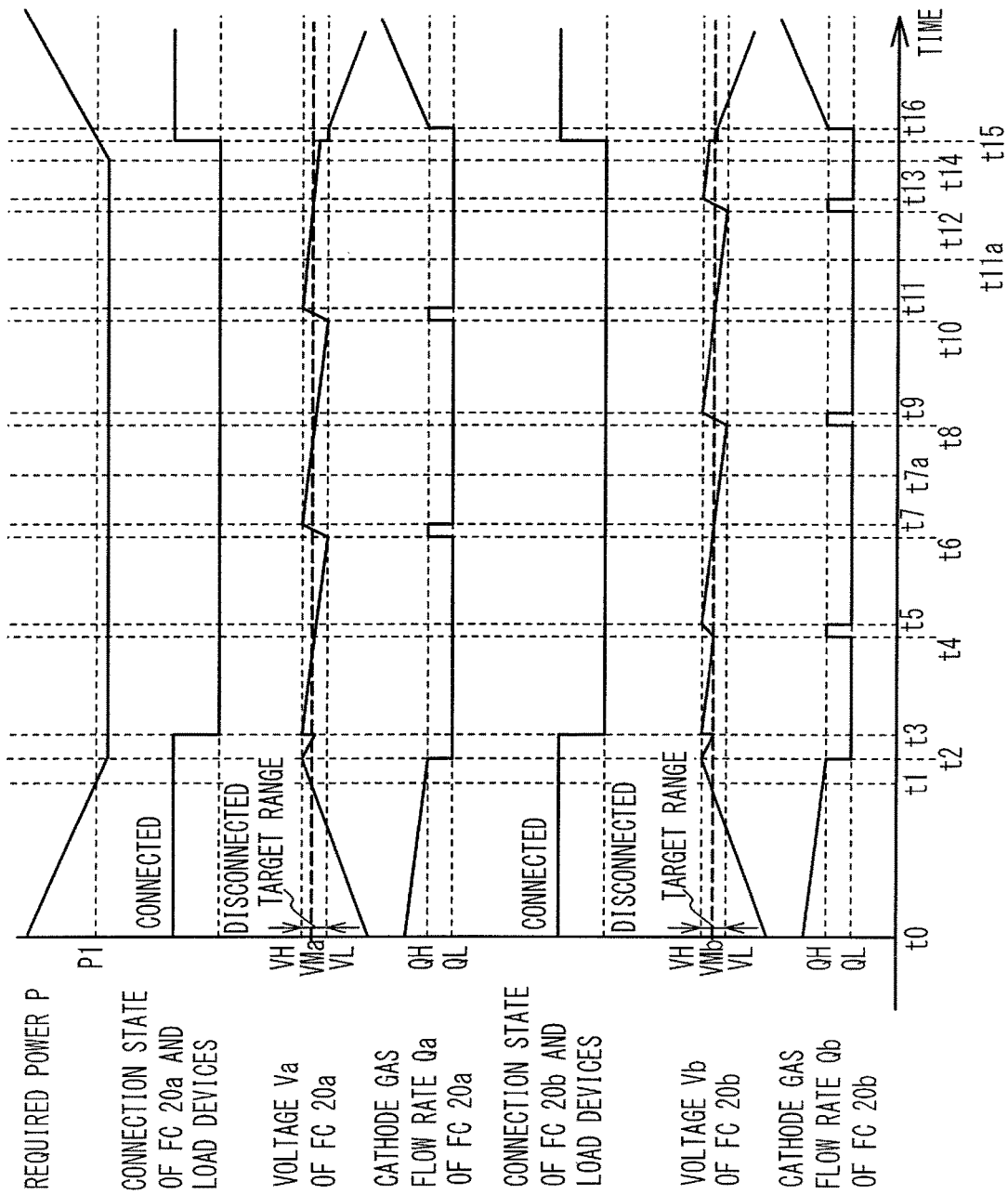
FIG. 6 is a timing chart illustrating a variation of the open-circuit voltage control of the FC 20b.

Next, a description will be given of a variation of the open-circuit voltage control of the FC 20b. FIG. 6 is a timing chart illustrating a variation of the open-circuit voltage control of the FC 20*b*. The open-circuit voltage control of the FC 20*a* is the same as that described above one, and therefore the explanation thereof is omitted.

When the voltage Vb is equal to or lower than the criterion value VMb and when the voltage Va is equal to or lower than the criterion value VMa at time t4, the flow rate Qb is controlled to be the target flow rate QH, and the voltage Vb starts increasing. Each of criterion values VMb and VMa is preset, is smaller than the upper limit value VH and greater than the lower limit value VL. Each of the criterion values VMb and VMa may be the median of the upper limit value VH and the lower limit value VL. Further, each of the criterion values VMb and VMa is not limited to the median between the upper limit value VH and the lower limit value VL, may be obtained by adding the lower limit value VL to a value between 30 percent and 70 percent of the difference between the upper limit value VH and the lower limit value VL, and may be obtained by adding the lower limit value VL to a value between 40 percent and 60 percent of the difference between the upper limit value VH and the lower limit value VL. The criterion value VMa is an example of a first criterion value, and the criterion value VMb is an example of a second criterion value.

When the voltage Vb reaches the upper limit value VH at time t5, the flow rate Qb is controlled to be the target flow rate QH, and then the voltage Vb starts decreasing. Next, at time t7*a* between time t7 and time t8, the voltage Vb is equal to or lower than the criterion value VMb, but the voltage Va is higher than the criterion value VMa, so that the flow rate Qb continues to be controlled to be the target flow rate QL. When the voltage Va is equal to or lower than the criterion value VMa at time t8, the flow rate Qb is controlled to be the target flow rate QH, and then the voltage Vb starts increasing. When the voltage Vb reaches the upper limit value VH at time t9, the flow rate Qb is controlled to be the target flow rate QH, and then the voltage Vb starts decreasing.

At time t11*a* between time t11 and time t12, the voltage Vb is equal to or lower than the criterion value VMb, but the voltage Va is higher than the criterion value VMa, so that the flow rate Qb continues to be controlled to be the target flow rate QL. When the voltage Va is equal to or lower than the criterion value VMa at time t12, the flow rate Qb is controlled to be the target flow rate QH and the voltage Vb starts increasing. When the voltage Vb reaches the upper limit value VH at time t13, the flow rate Qb is controlled to be the target flow rate QH, and then the voltage Vb starts decreasing.

As described above, the flow rate Qb increases when the voltage Vb is equal to or lower than the criterion value VMb and when the voltage Va is equal to or lower than the criterion value VMa, and the flow rate Qa increases when the voltage Va is equal to or lower than the lower limit value VL, like the above embodiment. Thus, the flow rates Qa and Qb increase and decrease at different timing, and the voltages Va and Vb also increase and decrease at different timing. This causes both voltages Va and Vb to avoid being brought into the low states, and to improve the response of the FCs 20*a* and 20*b* to the required power.

[Flowchart Illustrating a Variation of Open-Circuit Voltage Control of FC 20*b*]

Figure 7:
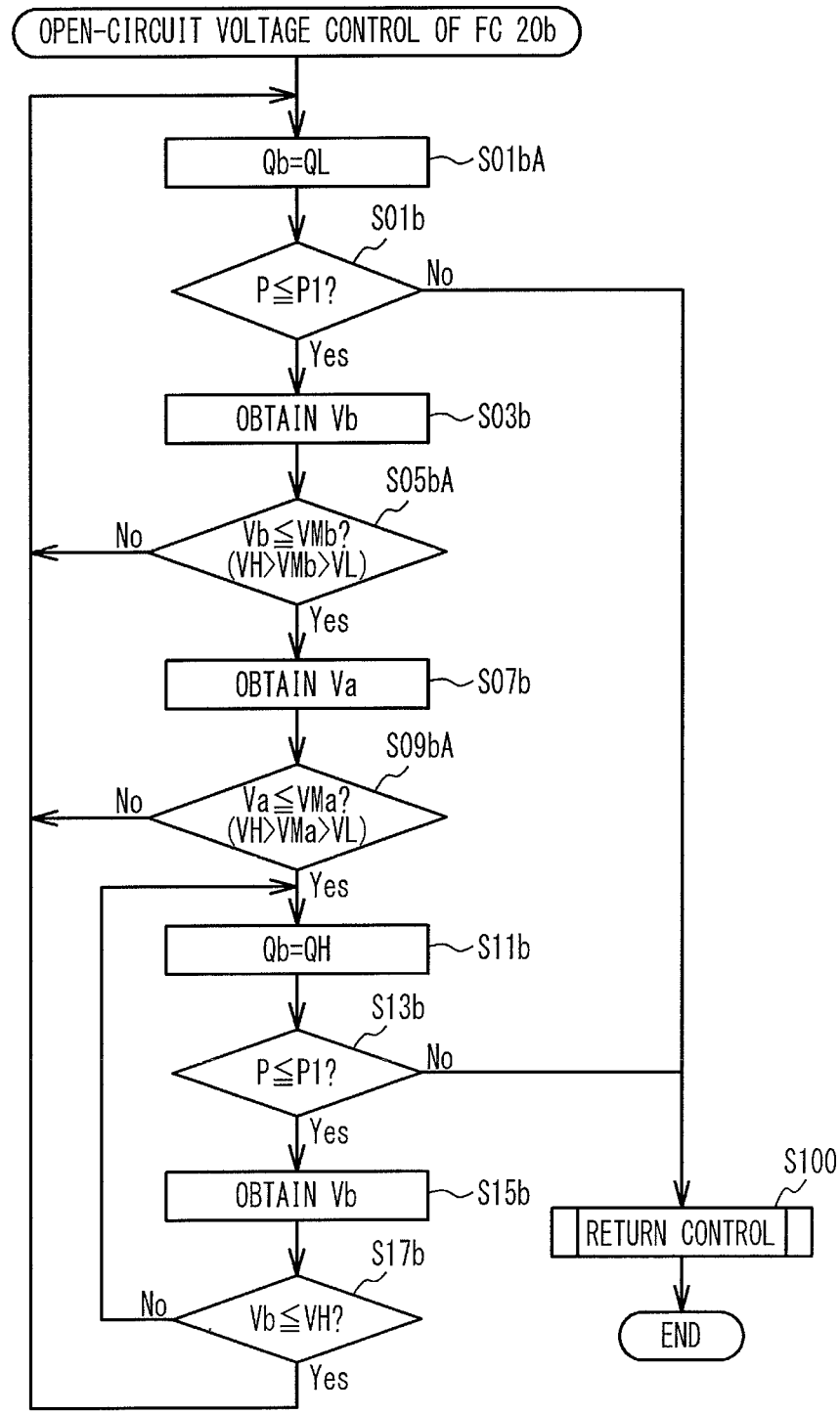
FIG. 7 is a flowchart illustrating the variation of the open-circuit voltage control of the FC 20b.

FIG. 7 is a flowchart illustrating the variation of the open-circuit voltage control of the FC 20*b*. The same process as that of the above-described embodiment will be denoted by the same reference numerals, and the duplicated explanation is omitted. First, the ECU 60 controls the flow rate Qb to be the target flow rate QL (step S01*b*A). When the flow rate Qb has already been controlled to be the target flow rate QL in step S3 described above, this state is continued in step S01*b*A. Next, when the processes of steps S01*b* and S03*b* are executed, the ECU 60 determines whether or not the voltage Vb is equal to or lower than the criterion value VMb (step S05*b*A). When No is determined in step S05*b*A, the process of step S01*b*A and the subsequent processes are executed again. When Yes is determined in step S05*b*A, the process of step S07*b* is executed, and the ECU 60 determines whether or not the voltage Va is equal to or lower than the criterion value VMa (step S09*b*A). When No is determined in step S09*b*A, the process of step S01*b*A and the subsequent processes are executed again. That is, as long as when Yes is determined in step S01*b* and No is determined in any of steps S05*b*A and 09*b*A, the flow rate Qb continues to be controlled to the target flow rate QL.

When Yes is determined in both steps S05*b*A and 09*b*A, the ECU 60 controls the flow rate Qb to be the target flow rate QH (step S11*b*), and executes the processes of steps S13*b*, S15*b*, and S17*b* described above. When Yes is determined in step S17*b*, the process of step S01*b*A is executed again.

As described above, conditions for increasing the flow rate Qb includes not only that the voltage Vb is equal to or lower than the criterion value VMb (Yes in step S05*b*A) but also that the voltage Va is equal to or lower than the criterion value VMa (Yes in step S09*b*A). This causes both voltage Va and Vb to effectively avoid being brought into the low states. In this variation, unlike the above-described embodiment, the lower limit value VL is not used to control the voltage Vb. However, accordingly, the voltage Vb is controlled to increase and decrease within a predetermined range.

In the variation, the order of steps S03*b* and S05*b*A and steps S07*b* and S09*b*A may be reversed.

In the above-described embodiment and variation, the target flow rate QL may be zero.

As illustrated in FIGS. 2 and 6, the open circuit voltage is controlled by controlling the flow rates Qa and Qb in a rectangular shape, but not limited thereto. At least a part of at least one of the flow rates Qa and Qb may be controlled to increase or decrease linearly or curvilinearly, or may be controlled in a sine wave manner. In this case, the timing at which the flow rate increases means the timing at which the flow rate switches from a decreasing state to an increasing state, and the timing at which the flow rate decreases means the timing at which the flow rate switches from an increasing state to a decreasing state.

The flow rate Qa is controlled by adjusting the opening degree of the bypass valve 15*a* in the embodiment and the variation described above, but not limited thereto. The flow rate Qa may be controlled by adjusting at least one of the rotational speed of the air compressor 14*a*, the opening degree of the bypass valve 15*a*, and the opening degree of the back pressure valve 17*a*. For example, when the flow rate Qa is controlled to be the target flow rate QL from a state where the flow rate Qa is greater than the target flow rate QL, only the rotational speed of the air compressor 14*a* may be decreased without changing the opening degrees of the bypass valve 15*a* and the back pressure valve 17*a*. Alternatively, only the opening degree of the back pressure valve 17*a* may be decreased without changing the rotational speed of the air compressor 14*a* and the opening degree of the bypass valve 15*a*. Additionally, in the case of adjusting only the rotational speed of the air compressor 14*a* to control the flow rate Qa, the energy loss amount due to the air compressor 14*a* is decreased, as compared with the case of adjusting only the opening degree of the bypass valve 15a or the back pressure valve 17a. The same applies to the flow rate Qb.

The system 1 described above includes, but not limited to, the two air compressors 14a and 14b. For example, instead of the two air compressors 14a and 14b, a single air compressor and pipes connecting the air compressor and both supply pipes 11a and 11b are provided, and the flow rates Qa and Qb may be controlled by controlling the opening degrees of the bypass valves 15a and 15b and the back pressure valves 17a and 17b.

The flow rates Qa and Qb increase and decrease at different timing by use of the criterion values VM, VMa, and VMb in the above-described embodiment and variations, but not limited thereto. For example, the flow rates Qa and Qb may increase and decrease at different timing, by intentionally shifting the timing at which the FC 20a is disconnected from the load devices from the timing at which the FC 20b is disconnected from the load devices. In this case, the criterion values VM, VMa, and VMb described above are not needed.

The system 1 described above includes two FCs 20a and 20b, but may include three or more fuel cells. In this case, at least two open circuit voltages of the fuel cells may be controlled as described above. Also in this case, it is possible to suppress the open circuit voltages of all the fuel cells from being brought into the low states.

The fuel cell system is installed on the vehicle, but not limited thereto. For example, a stationary fuel cell system may be used. The vehicle may be not only a car but also a motorcycle, a railway vehicle, a ship, an aircraft or the like. Further, the vehicle may be a hybrid vehicle that use a motor and an internal combustion engine together.

Although some embodiments of the present disclosure have been described in detail, the present disclosure is not limited to the specific embodiments but may be varied or changed within the scope of the present disclosure as claimed.

The invention claimed is:

1. A fuel cell system comprising:
   a fuel cell unit including first and second fuel cells that supplies electric power to a load device;
   first and second supply systems configured to respectively control first and second flow rates of cathode gas respectively supplied to the first and second fuel cells;
   a switching device capable of switching the fuel cell unit and the load device between an electrically connected state where the fuel cell unit is electrically connected to the load device, and an electrically disconnected state where the fuel cell unit is electrically disconnected to the load device;
   a switching control unit configured to switch the fuel cell unit and the load device to the electrically disconnected state, when required power of the fuel cell unit is equal to or smaller than a threshold;
   an open circuit voltage obtaining unit configured to obtain a first open circuit voltage of the first fuel cell and a second open circuit voltage of the second fuel cell in the electrically disconnected state; and
   a supply system control unit programmed to increase and decrease the first and second open circuit voltages so as to respectively converge within first and second target ranges, by controlling the first and second supply systems to increase and decrease the first and second flow rates at different timing.

2. The fuel cell system of claim 1, wherein the supply system control unit is programmed to increase and decrease the first and second flow rates at different timing, by increasing the second flow rate during at least one of periods in which the second open circuit voltage is decreasing before the second open circuit voltage is equal to or lower than a lower limit value of the second target range.

3. The fuel cell system of claim 2, wherein the supply system control unit is programmed to increase and decrease the first and second flow rates at different timing, by increasing the second flow rate during at least one of periods in which the second open circuit voltage is decreasing when the second open circuit voltage reaches a value obtained by adding the lower limit value of the second target range to a value between 30 percent and 70 percent of a difference between the lower limit value and an upper limit value of the second target range.

4. The fuel cell system of claim 1, wherein the supply system control unit is programmed to increase and decrease the first and second flow rates at different timing, by increasing the second flow rate when the first open circuit voltage is equal to or lower than a first criterion value between an upper limit value and a lower limit value of the first target range and when the second open circuit voltage is equal to or lower than a second criterion value between an upper limit value and a lower limit value of the second target range.

5. The fuel cell system of claim 4, wherein
   the first criterion value is equal to the lower limit value of the first target range added to a value between 30 percent and 70 percent of a difference between the upper limit value and the lower limit value of the first target range, and
   the second criterion value is equal to the lower limit value of the second target range added to a value between 30 percent and 70 percent of a difference between the upper limit value and the lower limit value of the second target range.

6. The fuel cell system of claim 1, wherein the supply system control unit is programmed to increase and decrease the first and second flow rates in a same period.

* * * * *